United States Patent Office 3,154,491
Patented Oct. 27, 1964

3,154,491
METHOD OF PREPARING LUBRICANT GREASE
Arthur C. Borg, Chicago, Ill., and Stephen J. Zajac and Reuben A. Swenson, Whiting, Ind., assignors to Standard Oil Company, Chicago, Ill., a corporation of Indiana
No Drawing. Filed Apr. 25, 1962, Ser. No. 189,952
4 Claims. (Cl. 252—51.5)

This invention relates to the preparation of lubricant greases, and more particularly concerns a novel method of preparing certain high temperature greases.

Lubricant greases, comprising normally liquid lubricant vehicles thickened to grease consistency with normally solid thickening agents, are currently being required to serve under conditions of high temperature and high loads and speeds. Both the lubricant vehicle and the thickening agent must be capable of performing satisfactorily. Until recently, it was the thickening agent rather than the vehicle which had imposed limitations on grease performance.

Recently, it has been discovered that certain arylcarbamyl compounds and certain related ureido compounds are outstanding grease thickeners, particularly when used in conjunction with special lubricant vehicles such as the silicone oils (see, respectively, Swakon and Brannen, U.S. Patents 2,710,839, 2,710,840, and 2,710,841; Rosscup and Liehe, U.S. application S.N. 750,050, now U.S. Patent 3,015,625). Arylcarbamyl-thickened and ureido-thickened greases have been widely accepted for high temperature and high load and speed service conditions. It is with these aryl-carbamyl-thickened and ureido-thickened greases that the present invention is concerned.

In the past, such greases have generally been prepared by forming the thickener in the presence of all or part of the lubricant vehicle. This has the advantage of producing a thickener having desirable oleophilicity, but at the same time is inconvenient in that it requires that large volumes of toxic materials be handled. Forming the thickener in the absence of the vehicle ("pre-forming"), which would permit the handling of smaller quantities of materials, has resulted in thickeners which are less oleophilic, and which accordingly are mechanically unstable and require more of the thickener to reach a given grease penetration.

A major feature of the present invention is that it provides a method of preparing arylcarbamyl-thickened and ureido-thickened greases from pre-formed thickeners in a manner which results in thickener oleophylicity heretofore characteristic only of thickeners prepared in situ.

According to the invention, arylcarbamyl compounds or ureido compounds of hereinafter-defined structure are first prepared in the substantial absence of any lubricant vehicle, taking whatever precautions may be necessary with regard to the toxicity of the reactants and byproducts. Then, after substantially drying the resultant compounds, they may be stored without hazard until they are processed into the grease. To effect such processing, the dried thickener, the lubricant vehicle, and conditioning agent selected from the class consisting of butanol and water, are intimately admixed together and heated to a temperature sufficient to drive off the conditioning agent. This heating is followed by further heating to a temperature above about 300° F., and preferably to the highest operating temperature at which the grease is ultimately to be employed, so as to "structure" the grease. The resultant grease is then cooled and milled, and is ready for use.

There is no ready explanation for the mechanism of the present invention. On the one hand, it is known that certain solvents, including ethyl acetate, improve arylcarbamyl thickened greases which are prepared in situ in the lubricant vehicles, but ethyl acetate is inoperative when tried as a conditioning agent according to the inventive technique. On the other hand, it would hardly seem possible that water would render an organic compound more attractive to oil; yet this is precisely what happens. Regardless of the explanation, the results of the present invention are quite striking.

Arylcarbamyl compounds suitable as grease thickeners are the high melting aromatic ureas, di-ureas, amides, and di-amides, all of which contain at least one

radical, wherein R is an aryl radical. Suitable arylcarbamyl compounds have the following empirical structures:

 (1)

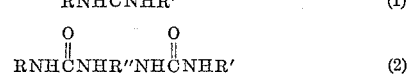 (2)

 (3)

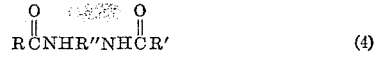 (4)

 (5)

In the above formulae, R, R' and R" represent unsubstituted or substituted aryl or alkyl aryl radicals containing no more than 12 cyclic carbon atoms. With the exception that R" is necessarily a divalent radical, e.g. phenylene, biphenylene, naphthylene, etc., these radicals may be the same or different, e.g. phenyl, biphenyl, naphthyl, etc. in each compound. The aryl or alkyl aryl radicals may be substituted radicals containing various reactive substituents such as hydroxy, carboxy, halo, nitro-, etc. The compound should have a melting point in excess of 250° F.

Examples of amides and di-amides which have been found to yield excellent greases when employed as thickeners are N-benzoyl-4-aminobiphenyl, N,N'-dibenzoylbenzidine, N,N'-dibenzoyl-p-phenylenediamine and N,N'-bis-(p-nitrobenzoyl)-benzidine. Such compounds may be readily prepared by techniques well known to the art, e.g. by reaction of an aromatic amine or diamine such as phenylene-diamine, aniline, benzidine, etc., with an aroyl halide, e.g. benzoyl chloride. Diamides such as may be prepared by reacting an aromatic monoamine, e.g. aniline, with an aroyl halide such as a phthalyl chloride, may likewise be employed in accordance herewith. These compounds may be employed alone or in combination to thicken oleaginous vehicles to grease consistency.

Examples of various ureas and di-ureas which have been found useful as thickeners are p-carboxy-1,3-diphenylurea; p-chloro-1,3-diphenylurea; 1,3-di-(1-naphthyl)-urea; 4,4'-bis-[3-(p-biphenylyl)-ureido]-biphenyl; 1-(p-carboxyphenyl) - 3 - (p-biphenylyl)-urea; 1-(p-carboxyphenyl) - 3 - (o-biphenylyl)-urea; 1,3-di-(p-biphenylyl)-urea; 1,3 - di - (o - biphenylyl) - urea; 4,4'-bis-(3-phenylureido)-3,3'-dimethoxy biphenyl; p-phenylurethan-1,3-diphenyl-urea; p-cyano-1,3-diphenyl-urea; 1-(2,5-dichlorophenyl) - 3 - phenyl-urea; 4,4'-[3-(2,5-dichlorophenyl)-ureido] - biphenyl; 1,4 - bis-[3-(2-chlorophenyl)-ureido]-benzene; 1,4 - bis - [3-(3-chlorophenyl)-ureido]-benzene; 1,3-bis-[3-(3-chlorophenyl)-ureido]-benzene, and 1,3-bis-[3-(2-chlorophenyl)-ureido] - benzene. Compounds of this type may readily be prepared by reacting an amine or diamine such as aniline, benzidine, phenylenediamine, etc. with an isocyanate of benzene diphenyl, etc. It should be understood that the specific aryl carbamyl compounds set forth above are enumerated for purposes of illustration and not of limitation. Compounds of this class may be employed alone or in combination with other such compounds to thicken oleaginous vehicles in accordance herewith.

Superior arylcarbamyl-thickened greases are those ureas (Formula 1 above) and di-ureas (Formula 2 above) which are prepared from a mixture of two different amines and one diisocyanate or a diamine and two mono-isocyanates, as described in U.S. 2,710,840. An especially preferred grease is made from bitolylene diisocyanate, p-chloroaniline, and p-toluidine.

Ureido compounds suitable as grease thickeners have the general formula

where $R^{iii}$ and $R^{v}$ are the same or different abietyl radicals selected from the group dehydroabietyl radical, dihydroabietyl radical, and tetrahydroabietyl radical and mixtures thereof, and $R^{iv}$ is an alkylene radical or substituted alkylene radical of from 1 to about 30 carbon atoms or an arylene radical or a substituted arylene radical. The radicals $R^{iii}$, $R^{iv}$ and $R^{v}$ can contain substituents such as, for example, alkyl, alkoxy, cyano, aryl, hydroxy, carboxy, halogen, nitro and other substituent groups. The alkylene radical can contain a straight and/or branched chain, and the arylene radicals can contain mononuclear or polynuclear radicals such as phenylene, biphenylene, naphthylene, anthrylene and phenanthrylene radicals. The terms "alkylene and arylene radicals" as used herein and in the appended claims includes substituted alkylene radicals and substituted arylene radicals.

These thickeners, their preparation, and their use in lubricant greases are described in application S.N. 750,050, by Robert J. Rosscup and Herbert J. Liehe, filed July 21, 1958, now U.S. Patent 3,015,625.

The general structural formulas of the abietyl radicals are:

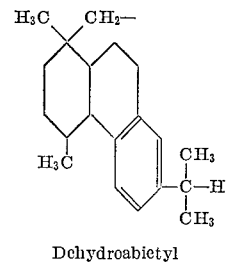

Dehydroabietyl (II)

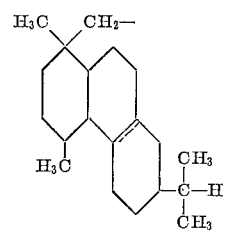

Dihydroabietyl (III)

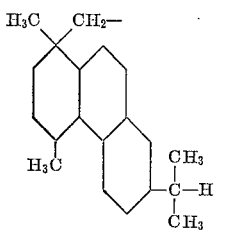

Tetrahydroabietyl (IV)

The ureido compound can be prepared by heating a mixture of an abietyl amine and a polyisocyanate in the equivalent weight ratio of 1:1, at a temperature within the range of room temperature (about 70° F.) to about 450° F.

Examples of abietyl amines, e.g. aliphatic amines attached to an alicyclic structure, which can be used in the preparation of the above described ureido compounds are dehydroabietyl amine, dihydroabietyl amine and tetrahydroabietyl amine or mixtures of such amines. A particularly well suited amine is a product marketed by Hercules Powder Company as "Rosin Amine D." This product is prepared by the catalytic hydrogenation of "Rosin Nitrile D" prepared by the action at elevated temperatures of ammonia on hydrogenated rosin. Distilled and undistilled grades are available as "Amine 750" and "Amine 751." The "Rosin Amine D" is a mixture of abietyl amines in the following approximate proportion:

| | "Rosin Amine D," percent |
|---|---|
| Dehydroabietyl amine | 60 |
| Dihydroabietyl amine | 30 |
| Tetrahydroabietyl amine | 10 |

Examples of suitable polyisocyanates are tolylene diisocyanate; p,p'-diisocyanate biphenyl; 1,4-diisocyanate-benzene; p,p'-diisocyanate-diphenylmethane; 1,6-diisocyanate-hexane; 1,12-diisocyanate-dodecane; 1,3,5-benzene-triisocyanate; naphthylene diisocyanate; bitolylene diisocyanate; tris-p-isocyanate-phenylmethane; etc.

The following is illustrative of the apparent reaction which takes place:

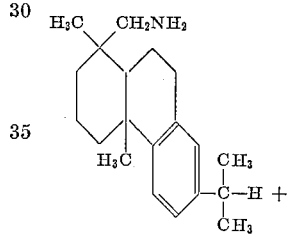

Dehydroabietylamine

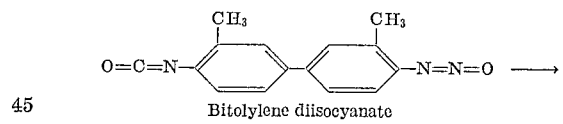

Bitolylene diisocyanate

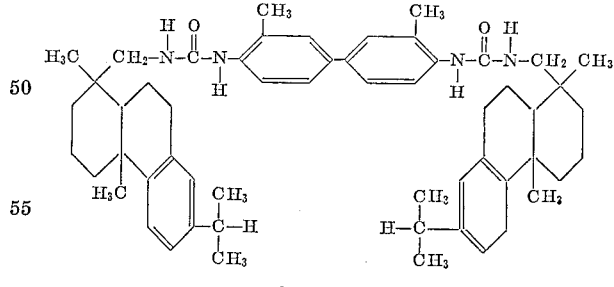

Substituted urea

Normally liquid lubricant vehicles, also termed "oleaginous bases," "fluids," etc. which are thickened with the foregoing compounds to form greases illustratively include the silicone polymer oils, mineral lubricating oils, synthetic hydrocarbon lubricating oils, synthetic lubricating oils such as polyalkylene glycols and their derivatives, high molecular weight esters of dicarboxylic acids, polyfluoro derivatives of organic compounds such as the trifluorovinyl chloride polymers known as "Fluorolube" and the trifluorochloroethylene polymers known as "Kel-F," and other lubricant vehicles.

The silicone polymer oils which may be employed in conjunction with the present invention are those falling substantially within the lubricating oil viscosity range, e.g. possessing a viscosity at 100° F. within the range of about 25 to about 3500 SSU. These silicone oils are polyalkyl or polyalkaryl siloxanes such as methyl siloxane or methyl phenyl siloxane. Mineral oils in the lubricating oil viscosity range, e.g. from about 50 SSU at 100° F. to about 300 SSU at 210° F., and preferably solvent extracted to substantially remove the low viscosity index constituents, are also suitable. Similarly, synthetic lubricating oils resulting from polymerization of unsaturated hydrocarbons or other oleaginous materials within the lubricating oil viscosity range such as high molecular weight polyoxyalkylene compounds typified by polyalkylene glycols and esters thereof, aliphatic diesters of dicarboxylic acids such as the butyl, hexyl, 2-ethylhexyl, decyl, lauryl, etc., esters of sebacic acid, adipic acid, azelaic acid, etc., may be thickened to produce excellent greases. Polyfluoro derivatives of organic compounds, particularly hydrocarbons, and dibasic acid esters of $H(CF_2)_nCH_2OH$, in the lubricating oil viscosity range can also be thickened. Other synthetic oils, such as esters of aliphatic carboxylic acids and polyhydric alcohol, e.g. trimethylolpropane tripelargonate and pentaerythritol hexanoate, can be used as suitable oil vehicles. Where the grease product is to be employed under high temperature conditions, e.g. about 400° F., lubricating oil vehicles which are stable, i.e. do not decompose at the temperatures to be encountered, should be used as the vehicle. For such uses, silicone polymers and diesters of dicarboxylic acids are preferred.

The inventive greases ordinarily contain from about 5 to about 70 percent by weight, preferably from about 8 to about 50 percent, of the arylcarbamyl and/or the ureido compound or compounds.

The pre-formed thickening agents may be prepared by any of the methods known in the art which will provide a dry agent. An especially preferred method consists in preparing the arylcarbamyl or ureido compound by chemical reaction of its ingredients directly in a volatile inert organic solvent, although dry preparation is also effective. Thus, for example, an arylcarbamyl grease may be prepared by first introducing the amine component or components dissolved in an organic solvent to a solution of the isocyanate or isocyanates in the same solvent. Various solvents may be used. Their requirements are that they be chemically inert with respect to the vehicles and reactants, that they boil at a temperature permitting ready removal from the grease preferably substantially below 300° F., e.g. 200–275° F., and that they dissolve substantially completely the reactants employed to produce the thickening agents. An immediate reaction occurs at room temperature to produce the thickener during rapid agitation of the mixture. Higher temperatures may be employed if desired. When reaction is complete, the solvent, e.g. dioxane, chloroform, benzene, ethyl acetate, 2-butanone, etc., is removed, preferably by heating at atmospheric pressure (vacuum or superatmospheric pressures may be employed if desired).

After the foregoing preparation, the dry or dried (i.e., solvent-free) thickening agent may be stored for as long as desired, with no special precautions being taken since the agents are non-toxic.

To finally prepare the grease, the dry thickening agent is admixed with the desired quantity of lubricant vehicle and with the butanol and/or water conditioning agent, and the mixture heated, advantageously with agitation. Either n-butanol, sec-butanol, tert-butanol, or water, alone or in combinations with each other, may be used. Preferably all of the vehicle is added at this stage, with anywhere from 1.0 to 90 weight percent of the mixture being conditioning agent.

The resultant mixture is then heated to a temperature sufficient to distill off the conditioning agent. Any temperature above its boiling point (212° F. for water at atmospheric pressure; 244° F. for n-butanol; 212° F. for sec-butanol; 181° F. for tert-butanol) is adequate for the purpose, but superior results are apparently achieved with temperatures around 220–250° F., preferably about 230–240° F., employing superatmospheric pressure. The conditioning agent may be batch-distilled off without reflux.

Following removal of the conditioning agent, the mixture is further heated to a temperature above about 300° F. and sufficient to "structure" the grease. "Structuring" is a rather nebulous concept and has not been satisfactorily explained on a theoretical basis, but can readily be demonstrated by comparing the penetrations and mechanical stabilities of otherwise-identical greases made with and without the structuring step; the former is buttery and smooth, with comparatively low penetration which changes little on working, while the unstructured grease is a thin paste showing high penetration and poor mechanical stability. Optimum structuring temperatures and times vary with thickening agent and oleaginous vehicle, as well as (to some extent) the temperatures at which the final grease is to be used. Hence, while optimum structuring conditions will require some experimentation in connection with a specific grease formulation, it will generally involve a temperature above about 300° F. and below about 500, ordinarily somewhere in the range of about 375–425° F., and for a time of from 2 minutes to 70 hours. It is apparently important that the structuring temperature not be so high as to melt the thickening agent.

After the heating step is complete, the grease may be cooled to about 150–250° F., whereupon any additives may be added in the desired amount with stirring or other effective agitation. The grease then is cooled to room temperature and milled, as in a colloid mill, a roll mill, an Eppenbach mill, or a homogenizer. The resulting greases are smooth and buttery in texture and have excellent mechanical and thermal stability.

The invention is illustrated in the ensuing examples, which are for the purpose of illustration and are not considered to be wholly definitive with respect to scope or conditions.

*Example I*

In this example a mineral oil is thickened with the preformed reaction product of bitolylene diisocyanate and Rosin Amine D.

The thickening agent is prepared by reaction of 35 parts by weight of Rosin Amine D with 15 parts bitolylene diisocyanate in 30 parts of ethyl acetate as solvent at 160° F. for 2 hours. After reaction has been completed, the solvent is removed by heating to 200–250° F.

A grease is prepared by mixing 10 parts of the above thickening agent, 30 parts solvent-extracted SAE–40 mineral oil, and 30 parts by weight n-butanol; heating in an open vessel to 230–240° F. for 15 minutes; heating to 390–400° F. for 20 minutes; and cooling and roll milling.

The resultant grease is bright, with an ASTM D1403–56T penetration of 312 as made and a 323 penetration after working 60 strokes in the ASTM D217–52T worker.

*Example II*

In this example a silicone base vehicle (Dow Corning QF–4039 Silicone Fluid, a high-phenyl type methyl silicone) is thickened with 23.5 percent of a thickener prepared by reacting bitolylene diisocyanate, p-chloroaniline, and p-toluidine according to the invention.

The greases are prepared by mixing 12.5 percent bitolylene diisocyanate, 5.97 percent p-chloroaniline, 5.01 percent p-toluidine, and benzene, and heating after reaction to recover the thickening agent. The agent is mixed with eight times its weight of Silicone Fluid and twice its weight of water; heated to 220° F. for 20 minutes; and heated to 400° F. for one hour. During the manufacturing process when the grease has cooled to about 200° F., 0.67 percent dodecnyl succinic acid is added as an oxidation inhibitor. The resulting grease is milled, then tested for penetration before and after working 60 strokes. An excellent bright grease is obtained. By contrast, a similar grease made with a pre-formed thickener without a conditioning agent is of poorer quality.

*Example III*

In this example, greases are made with a pentaerythritol ester of $C_6$–$C_8$ fatty acids (Hercolube A, Hercules Powder Company) thickened with 18.95 weight percent of the reaction product of bitolylene diisocyanate and p-chloroaniline.

The grease in this example is prepared from 9.61 weight percent bitolylene diisocyanate, 9.14 percent p-chloroaniline, 0.20 percent of a rosin-derived amine, 0.5 percent phenothiazaine, 0.11 percent of a propylene diamine type metal deactivator, 0.003 percent blue dye, and the balance Hercolube A.

The diisocyanate and p-chloroaniline are reacted in the presence of benzene and evaporated to dryness. Then, the resultant thickening agent and all of the lubricant vehicle, plus 20 weight percent (total mixture basis) of water is heated in an open vessel with agitation to 212° F. until the water is boiled off. The vessel is then closed and heating continued to 425° F. where it is maintained for one hour before cooling, adding the other additives, and milling.

An excellent grease is obtained.

*Example IV*

In this example, the thickening agent of Example I is used in a grease at 9.1 percent concentration.

One pound of the agent, 10 pounds of solvent-extracted SAE–40 oil, and 2 parts of n-butanol are charged to a covered grease kettle which is purged with nitrogen and heated with 22 pounds steam for 1½ hours (kettle pressure of 8 p.s.i.g.). Pressure is then released and condensate is collected.

The mixture is structured by heating to 380–390° F. for about 30 minutes, and is cooled and milled through an Eppenbach mill.

The grease has a penetration of 278 unworked; 278 worked 60 strokes; and only 303 worked 100,000 strokes. It has a drop point of 508° F.

*Example V*

In this example, the thickening agent of Example I is used in a grease at 10 percent concentration.

One pound of thickening agent, 9.0 pounds of solvent-extracted SAE–40 oil, and 600 grams water are charged to an electrically heated grease kettle and heated to an internal pressure of 46 p.s.i.g. The kettle is depressured and the cover removed, after which the mixture is dried out at 230° F. for 30 minutes (silicone antifoamant is added to break the form); structured at 390–400° F. for one-half hour; and cooled and milled.

The unworked grease has a penetration of 301. After working 60 strokes it is 303.

*Example VI*

In this example, a grease prepared according to the invention is compared with one made using ethyl acetate as a conditioning agent. Both greases use the thickening agent of Example I.

Each grease is prepared with one pound of dry thickening agent and 10 pounds solvent-extracted SAE–40 mineral oil. However one has two pints butanol added while the other has the same volume of ethyl acetate. Each is heated to 240° F. under 8 pounds pressure for 45 minutes and structured for 30 minutes at 380–390° F.

The grease prepared with butanol is bright and has a penetration of 278, both worked and unworked. The other is a liquid.

While the invention has been described in conjunction with specific embodiments thereof, it will be appreciated that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. The method of preparing a lubricant grease from a pre-formed dry thickening agent melting above about 250° F., which thickening agent is selected from the group consisting of

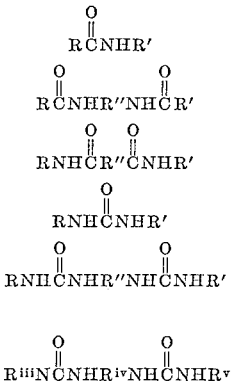

and wherein
(a) R and R' represent radicals containing no more than 12 cyclic carbon atoms, which radicals are selected from the group consisting of aryl, alkyl aryl, substituted aryl, and substituted alkyl aryl radicals,
(b) R'' represents a divalent radical containing no more than 12 cyclic carbon atoms, which radical is selected from the group consisting of arylene, alkyl arylene, substituted arylene, and substituted alkyl arylene radicals,
(c) $R^{iii}$ and $R^v$ represent abietyl radicals selected from the group consisting of dehydroabietyl, dihydroabietyl, and tetrahydroabietyl radicals, and
(d) $R^{iv}$ represents an organic radical selected from the group consisting of an alkylene radical of from 1 to about 30 carbon atoms and an arylene radical, which method comprises:
admixing said thickening agent with (1) an oleaginous lubricant vehicle and (2) a conditioning agent selected from the class consisting of water and butanol, said conditioning agent constituting from 1.0 to 90 weight percent of the mixture;
heating said mixture to a temperature sufficient to remove said conditioning agent;
continuing heating to a temperature above about 300° F. and sufficient to structure the grease;
and cooling and milling the grease.

2. The method of claim 1 wherein said thickening agent is prepared from bitolylene diisocyanate and an abietyl amine in the equivalent weight ratio of 1:1.

3. The method of claim 1 wherein said thickening agent is prepared from bitolylene diisocyanate and p-chloroaniline in the equivalent weight ratio of 1:1.

4. The method of claim 1 wherein said thickening agent is prepared from equimolar amounts of bitolylene diisocyanate, p-toluidine, and p-chloroaniline.

References Cited in the file of this patent

UNITED STATES PATENTS

| | | |
|---|---|---|
| 2,710,839 | Swakon et al. | June 14, 1955 |
| 2,710,840 | Swakon et al. | June 14, 1955 |
| 2,710,841 | Swakon et al. | June 14, 1955 |
| 2,832,739 | Swakon | Apr. 29, 1958 |
| 3,015,625 | Rosscup et al. | Jan. 2, 1962 |

UNITED STATES PATENT OFFICE
CERTIFICATE OF CORRECTION

Patent No. 3,154,491                                   October 27, 1964

Arthur C. Borg et al.

It is hereby certified that error appears in the above numbered patent requiring correction and that the said Letters Patent should read as corrected below.

Column 2, line 63, for "4,4′-[" read -- 4,4′-bis-[ --; column 4, lines 42 to 44, for the right-hand portion of the formula reading:

$$-N=N=O\rightarrow \qquad \text{read} \qquad -N=C=O\rightarrow$$

Signed and sealed this 11th day of May 1965.

SEAL)
Attest:

ERNEST W. SWIDER                                   EDWARD J. BRENNER
Attesting Officer                                        Commissioner of Patents